(12) United States Patent
Zhang et al.

(10) Patent No.: US 9,229,958 B2
(45) Date of Patent: Jan. 5, 2016

(54) RETRIEVING VISUAL MEDIA

(75) Inventors: Tong Zhang, San Jose, CA (US); Ke-Yan Liu, Beijing (CH); Xin-Yun Sun, Beijing (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 31 days.

(21) Appl. No.: 14/239,387

(22) PCT Filed: Sep. 27, 2011

(86) PCT No.: PCT/CN2011/001629
§ 371 (c)(1),
(2), (4) Date: Feb. 18, 2014

(87) PCT Pub. No.: WO2013/044407
PCT Pub. Date: Apr. 4, 2013

(65) Prior Publication Data
US 2014/0193048 A1    Jul. 10, 2014

(51) Int. Cl.
G06K 9/00    (2006.01)
G06K 9/54    (2006.01)
G06F 17/30    (2006.01)

(52) U.S. Cl.
CPC .... G06F 17/30268 (2013.01); G06F 17/30796 (2013.01); G06K 9/00288 (2013.01)

(58) Field of Classification Search
None
See application file for complete search history.

(56) References Cited

U.S. PATENT DOCUMENTS

| 5,805,746 A | 9/1998 | Miyatake et al. |
| 6,751,343 B1 | 6/2004 | Ferrell et al. |
| 7,864,989 B2 | 1/2011 | Song et al. |
| 8,285,713 B2 * | 10/2012 | Luo et al. ............. 707/723 |
| 8,452,794 B2 * | 5/2013 | Yang et al. ............ 707/767 |
| 9,026,526 B1 * | 5/2015 | Bau et al. ............. 707/728 |
| 2003/0210808 A1 * | 11/2003 | Chen et al. ............ 382/118 |
| 2006/0204142 A1 * | 9/2006 | West et al. ............ 382/305 |
| 2009/0116698 A1 | 5/2009 | Zhang et al. |

(Continued)

FOREIGN PATENT DOCUMENTS

| CN | 1851709 | 10/2006 |
| CN | 101000633 | 7/2007 |

(Continued)

OTHER PUBLICATIONS

A. Borras, F. Tous, et al., "High-Level Clothes Description Based on Colour-Texture and Structural Features," Pattern Recognition and Image Analysis, vol. 2652, pp. 108-116, Jun. 2003.

(Continued)

*Primary Examiner* — Daniel Mariam
(74) *Attorney, Agent, or Firm* — Brooks, Cameron & Huebsch, PLLC

(57) ABSTRACT

Examples of the present disclosure may include methods, systems, and computer readable media with executable instructions. An example method for retrieving visual media can include receiving a text query associated with a target content. A first group of visual media is identified based on correspondence of metadata of the visual media with the text query, and keyframes from the first group of identified visual media are selected. The method further includes detecting instances of a content type in the selected keyframes, and grouping similar instances of the content type into clusters. The target content is associated with a cluster having a greatest quantity of similar instances.

13 Claims, 5 Drawing Sheets

(56) References Cited

U.S. PATENT DOCUMENTS

| | | | |
|---|---|---|---|
| 2010/0030663 | A1 | 2/2010 | Wannier et al. |
| 2010/0067745 | A1 | 3/2010 | Kovtun et al. |
| 2010/0070523 | A1* | 3/2010 | Delgo et al. ............... 707/769 |
| 2010/0082614 | A1 | 4/2010 | Yang et al. |
| 2010/0271395 | A1 | 10/2010 | Isogai et al. |
| 2010/0306249 | A1* | 12/2010 | Hill et al. .................. 707/769 |
| 2011/0099488 | A1* | 4/2011 | Jin et al. .................... 715/764 |

FOREIGN PATENT DOCUMENTS

| | | |
|---|---|---|
| CN | 101901249 | 12/2010 |
| JP | 2000112958 | 4/2000 |
| KR | KR20100071822 | 6/2010 |

OTHER PUBLICATIONS

A.C. Gallagher and T. Ghen, "Clothing cosegmentation for recognizing people," in Computer Vision and Pattern Recognition, Jun. 2008, pp. 1-8.

C. Rother, V. Kolmogorov, and A. Blake, "Grabcut—interactive foregound extraction using iterated graph cuts," SIGGRAPH, vol. 23, pp. 309-314, Aug. 2004.

C. Tseng, S. Hung, et al., "An efficient garment visual search based on shape context", WSEAS Trans. on Comp., Issue 7, vol. 8, No. 10, pp. 1195-1204, Jul. 2009.

Chao, et al., "A Framework for Robust Feature Selection for Real-time Fashion Style Recommendation", IMCE'09, Oct. 23, 2009, Beijing, China, pp. 35-42.

D. Anguelov, K. Lee, S.B. Gokturk, and B. Sumengen, "Contextual identity recognition in personal photo albums," in Computer Vision and Pattern Recognition, Jun. 2007, pp. 1-7.

D. Ariguelov, K. Lee, S.B. Gokturk, and B. Sumengen, "Contextual identity recognition in personal photo albums," in Computer Vision and Pattern Recognition, Jun. 2007, pp. 1-7.

D.G. Lowe, "Distinctive image features from scale-invariant keypoints," International Journal of Computer Vision, vol. 60, pp. 91-110, Nov. 2004.

H. Chen, Z. Xu, Z. Liu, and S. Zhu, "Composite templates for cloth modeling and sketching," in IEEE Conference on Computer Vision and Pattern Recognition, vol. 1, pp. 943-950, DOI:10.119/CVPR, 2006.

Hsu, et al., "Video Search Reranking via lnformation Bottleneck Principle," MM'06, Santa Barbara, California, USA, Published: Oct. 23-27, 2006, 10 pages.

J. Liu and W. Lai, et al., "Video Search Re-Ranking via Multi-Graph Propagation", ACM Conf. on Multimedia, pp. 208-217, Sep. 2007.

K.E.A. van de Sande, T. Gevers, and C.G.M. Snoek, "Evaluating color descriptors for object and scene recognition," Pattern Analysis and Machine Intelligence, No. 9, pp. 1582-1596 Oct. 2010.

Kumar, et al., "Attribute and Simile Classifiers for Face Verification," Columbia University, retrieved from http://www.cs.columbia.edu/~belhumeur/conference/iccv09.pdf, retrieved on Aug. 18, 2011, 8 pages.

L. Xie, A. Natsev, et al., "Dynamic Multimodal Fusion in Video Search", IEEE Conf. on Multimedia and Expo, pp. 1499-1502, Jul. 2007.

L. Zhang, V. Hu, M. Li, W. Ma, and H. Zhang, "Efficient propagation for face annotation in family albums," in ACM Intl. Conf. on Multimedia, Oct. 2004, pp. 716-723.

Liu, et al., "Optimizing Video Search Reranking Via Minimum Incremental information Loss," ACM Multimedia Information Retrieval 2008, Vancouver, BC, Canada, Published: Oct. 2008, pp. 253-259.

M.J. Jones and P. Viola, "Fast multi-view face detection," in Computer Vision and Pattern Recognition, Jun. 2003.

P.Yogarajah, J. Condell, K. Curran, A. Cheddad, and P. McKevitt, "A dynamic threshold approach for skin segmentation in color images," in International Conference on image Processing Sep. 2010 pp. 2225-2228.

Tong Zhang, "Intelligent Keyframe extraction for video printing," ITCom'04 Conference on Internet Multimedia Management Systems, vol. 5601, p. 25-35, Philadelphia, Oct. 2004.

Tong Zhang, Jun Xiao, Di Wen, Xiaoqing Ding, "Face based image navigation and search," ACM Conference on Multimedia, Beijing, pp. 597-600, Oct. 2009.

Y. Jing and S. Baluja, "VisualRank: Applying PageRank to Large-Scale Image Search", IEEE Trans. Pattern Analysis and Machine Intelligence, vol. 30, No. 11, pp. 1-14, Nov. 2008.

Y. Song and T. Leung, "Context-aided human recognition: Clustering," in European Conference on Computer Vision, May 2006, pp. 382-395.

Y.Tian, W. Liu, R. Xiao, F. Wen, and X. Tang, "A face annotation framework with partial clustering and interactive labeling," in Computer Vision and Pattern Recognition, Jun. 2007, pp. 1-8.

Yamamoto, et al., "Fast Face Clustering Based on Shot Similarity for Browsing Video," Progress in informatics, No. 7, pp. 53-62, Published: Mar. 2010.

Yuan, Shuai., "A System of Clothes Matching for Visually Impaired Persons", Published: Oct. 2010, pp. 303-304.

Nazlä+–Ä Deg et al: "Person Search Made Easy", Aug. 4, 2005 (2005-058-04), Image and Video Retrieval; pp. 578-588.

Thomas Mensink et al: "Improving People Search Using Query Expansions", Oct. 12, 2008, pp. 86-99.

* cited by examiner

RETRIEVING VISUAL MEDIA

BACKGROUND

The amount of visual media on the Internet is growing due to people sharing photos and video, and by commercial efforts in response to increasing speeds and bandwidth capabilities of the network. Internet data transfer speeds are increasing. WEB 2.0 applications that facilitate participatory information sharing such as social networking sites, blogs, social media, and others are growing in number. Image-based and video sharing websites, such as FLICKR® (Google, Inc.), PICASA® (Google, Inc.), YOUTUBE® (Google, Inc.), etc., are growing in popularity. All of these capabilities and developments are making online content-based image manipulations very useful. Since new visual media is being uploaded to the Internet all the time, ways to efficiently organize, index, and retrieve desired visual media is a constant and ever-growing challenge. Organizing visual media can be an enormous endeavor.

People are often the principal subject matter in visual media, such as photos, images, and video frames. The ability to find visual media of a particular person easily and quickly in a visual media dataset is highly desired. Searching for visual media including a particular person can have many applications. Visual media content is best evaluated visually. However, legacy search tools are often text based, originally designed to return text results, and more recently expanding into applications involving image searches. That is, the search input is limited to text, such as a person's name, a noun, or written description of the visual media being sought. Text-based searching alone can be imprecise with respect to visual media results since, for example, many people can have the same name which can return visual media of many different people. Users aren't typically interested in all results returned in response to a text search query (e.g., images of all people named "Bob Smith"), but rather some portion of returned images such as an image of the "Bob Smith" they know. Therefore, some ordering of visual media search results can be beneficial to a user.

DETAILED DESCRIPTION

Figure 1:
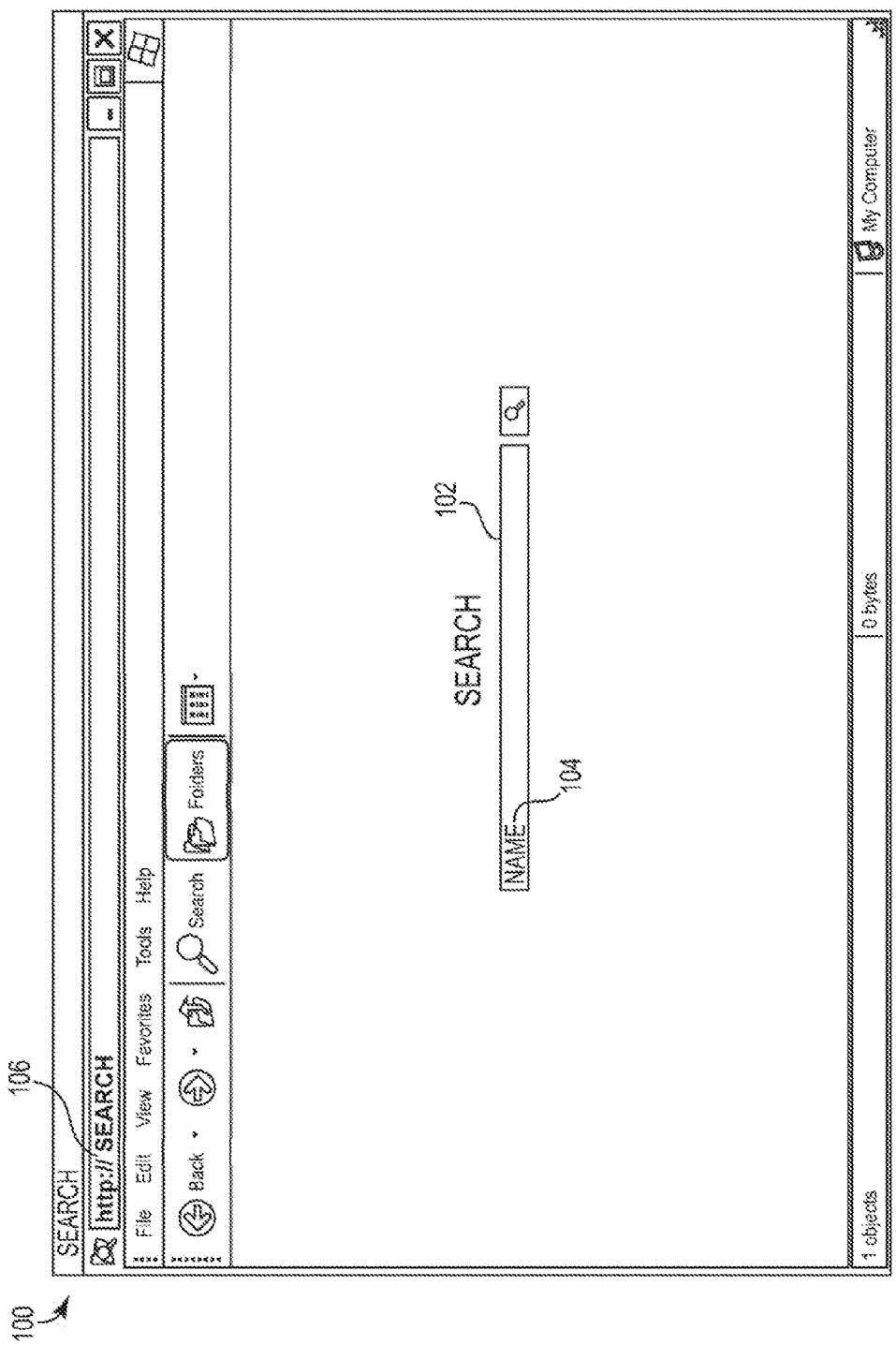
FIG. 1 illustrates a text-base search portal for retrieving visual media in accordance with one or more examples of the present disclosure.

Examples of the present disclosure may include methods, systems, and computer readable media with executable instructions, and/or logic. According to one or more examples of the present disclosure, an example method can include receiving a text query associated with a target content. A first group of visual media is identified based on correspondence of metadata of the visual media with the text query. Keyframes from the first group of identified visual media are selected. The method further includes detecting instances of a content type in the selected keyframes, and grouping similar instances of the content type into clusters. The target content is associated with a cluster having a greatest quantity of similar instances.

As used herein, the term "includes" means includes but not limited to, the term "including" means including but not limited to. The term "based on" means based at least in part on.

This disclosure provides a system and method for searching to find visual media of a particular person(s), for example, by using a network such as the Internet. According to examples of the present disclosure, the input to the system and/or method can be a text query, such as the names of one or more of the person(s) to be searched. The output of the system and/or method can be a display of visual media and/or a list of visual media containing the person(s). The list may include the location of visual media and/or segments thereof in each returned visual media that contain the person(s). For example, the list may indicate that the subject appears at certain times and/or locations in a particular visual media.

With such results, a user may view and/or edit the visual media of the person(s). That is, a user may select portions of the returned visual media to use in composing a new visual media. For example, a new video may be formed with one or more segments of the person(s) extracted from multiple returned videos. Such new visual media may include still images, either from original still images or extracted from video. The disclosed system and method may also be applied to discover people who appear frequently with the person(s) who were the identified target of the search. Visual media can be composed showing the person(s) who were the identified target of the search and others together. The results of the system and method for searching to find visual media of the present disclosure can also be used to generate statistics of people's co-appearance with the person(s) who were the identified target of the search.

When searching for visual media of a particular person, returned results from text query may be mixed. Some of the visual media may not contain the particular person at all, or may not even be related to the particular person. For example, a text search for "John Smith" can produce visual media for many different people named John Smith in addition to a particular John Smith of interest. By applying face clustering to frames in top returned visual media, facial features of the person can be obtained, which can subsequently be used to find more relevant visual media. No input sample of visual media (such as in query by example approaches) is necessary, and no training of a classifier is needed. Also, located visual media segments of the particular person can be used for repurposing.

FIG. 1 illustrates a text-based search portal for retrieving visual media in accordance with one or more examples of the present disclosure. The text-based search portal 100 can be, for example, a web page associated with an Internet, or other database, search engine 106. The text-based search portal 100 can be a front end of a commercially-available search engine 106 from which techniques of the present disclosure can be applied, or can be a front end for a stand-alone visual medial search system (e.g., a private visual media dataset).

The search portal 100 can include a search field 102 by which to receive a text query 104. The text query 104 can be, for example, one or more people's name or another descriptor of the sought-after visual media. For example, the text query 104 can be a title such as "president" or "pope," or be a description such as "first black president" or "leading man in Gone with the Wind movie."

For a text query 104, the visual medial search system can search a collection of visual media (e.g., images, video) and return visual media results based on text descriptions associated with particular ones of the visual media such as metadata therefore. Associated text descriptions can be in the form of visible and/or invisible text information associated with the visual media. Visible text information associated with visual media can include tagging or labeling on videos and images, the tags being capable of display along with the video/image. Invisible text information associated with visual media can include metadata associated with particular visual media, such as time, date, and/or place of capture, description of subject matter, etc, stored in a file associated with the visual media.

According to one or more examples of the present disclosure, various methods for retrieving visual media can involve for retrieving visual media via the Internet (e.g., images stored in the cloud, YOUTUBE® videos). With a text-based search engine, a number of videos can be returned. However, among the returned videos, some of the videos may not be related to particular person(s) being searched due to the noisy nature of text annotations. That is text annotations can be general, inaccurate, vague, imprecise, etc. Furthermore, among related videos, some of them may not contain the person(s). For example, a video annotated as "Johnny's graduation party" may capture those relatives who attended, rather than the subject of interest, Johnny. The videos may not be ranked by how much the target person(s) appear either.

Figure 2A:
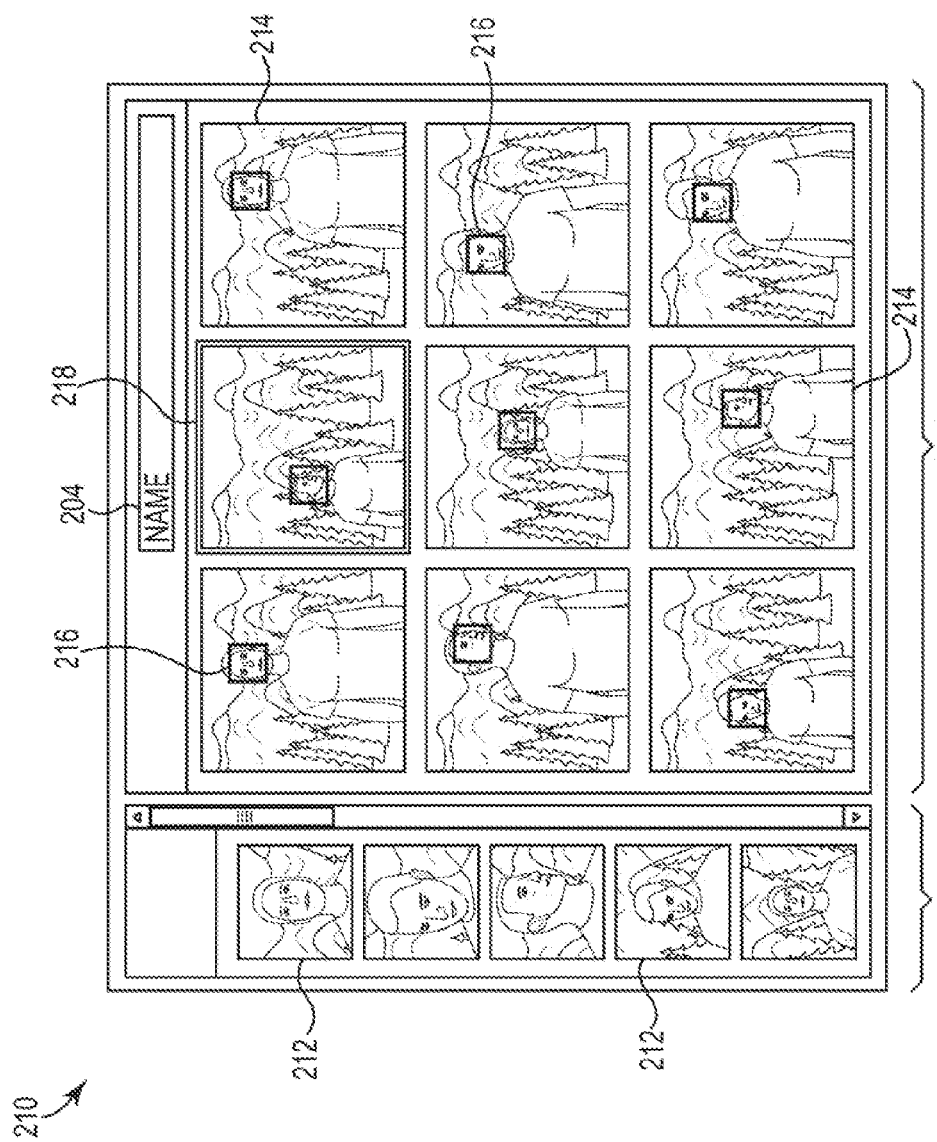
FIG. 2A illustrates a display of visual media returned responsive to a text-based query in accordance with one or more examples of the present disclosure.

FIG. 2A illustrates a display of visual media 210 returned responsive to a text-based query in accordance with one or more examples of the present disclosure. The display of visual media 210 can include a number of returned visual media 213 (e.g., videos, images) of the target content (e.g., person(s) being searched for), as well as a number of query images 211 derived from the returned visual media 213. The query images 211 can be derived from the returned visual media 213, for example, by face clustering or other identification techniques. Where the query images 211 are derived from the returned visual media 213 by face clustering techniques, the query images 211 may be face images 212, as shown.

As an example of the system and method for retrieving visual media of the present disclosure, the following discussion refers to video clips, such as those found on YOUTUBE®. However, the present disclosure is not limited to visual media being only such video and can include other types of visual media such as still images and/or other visual media file formats. The display of visual media 210 can be based on a text query. For a text query containing one or more people's names, the system can search, for example, in a collection of tagged visual media over the Internet (e.g., YOUTUBE® videos) using a text search engine (such as the one used in YOUTUBE®). A number of videos 214 can be returned. However, among the number of returned videos 214, some of the returned videos may not be related to the target content (e.g., particular person(s) being searched).

Keyframes can be extracted from the videos 214 returned from the text query. Keyframes intend one or more portions (e.g., a frame) of a returned video 214. Keyframes can be selected from the top N returned videos (e.g., 20). The system and/or method of the present disclosure are not limited to the example quantity discussed here, and may include keyframes selected from more or fewer returned visual media. The keyframes may be evenly sampled over time, or may be selected through an intelligent scheme. A keyframe collection can contain, for example, the keyframes selected from the N videos 214, or the query images 211 may be based on the keyframes (e.g. include some additional area around a keyframe).

A face detector can be applied to all the keyframes to detect one or more faces 216 in a keyframe. Face clustering can be performed in the keyframes. Face clustering can be conducted on all the detected faces 216. Faces of the same person can be grouped into a cluster. Even though there may be videos not related to the target person in the top N returned videos 214, or some of the top N returned videos 214 may not containing the target person, the largest face cluster can be assumed to correspond to the target person based on an assumption that at least some of the returned videos 214 contain the target person. There may be other, smaller face clusters that correspond to people who appear with the target person in the returned videos 214, or people who are not relevant at all.

Candidate query faces 212 can be automatically generated. A quantity, K, of face images (e.g., 4, 5) from each of the top face clusters can be selected. However, the quantity K is not limited to any particular value, and can be more or fewer than the example quantities provided herein. For one cluster, the face image 216 with the biggest face can be chosen. A face image 216 that may be most different from the chosen face image 216 can be selected. This process can continue until K face images 216 can be selected. For example, if the text query is "Barak Obama," the largest face cluster should correspond to President Barak Obama, and K face images 216 of his can be selected as a query image 212. Face images 216 of people who appear frequently enough in the returned videos 214 and have large enough face clusters may also be selected as a query image 212.

If the text query is "Clinton," there might be large face clusters of both Bill Clinton and Hilary Clinton, which can each be selected as a query image 212. There may also be face clusters of other people related to the name. Such automatically selected face images can be displayed to a user as query images 212 in an order of face cluster size (e.g. largest face cluster size being the top-most or right-most or top-right-most image), which is most likely to present face images 212 of the target person(s) in a most prominent position (e.g., at the top). However, examples of the present disclosure are not limited to any particular ordering. Other ordering schemes are possible and/or other means for indicating preferred candidate query images are contemplated, such as by highlighting, labeling, ordering, ranking, etc.

According to one or more examples, incremental clustering, e.g., online clustering, can be used for a dynamic environment in which new visual media data is continually added to the dataset, such as the Internet. Incremental clustering can be performed prior to a particular text query and/or stored based on a previous text query, and subsequently used to return visual media and/or determine appropriate clusters.

According to examples of the present disclosure, re-ranking of the query images 212 can be performed. A user may conduct a visual inspection of the query images 212, and select one or more query image 212 from the displayed array of query images 212. The query image 212 is a face image representative of a face cluster. Selecting a query image 212 indicates the face image of the targeted person(s) from among query images that may be of other person(s) (e.g., other persons with a same name).

Based on this visual query, the original returned M videos, where M is greater than or equal to N (i.e., the number of returned videos displayed) from text query can be re-ranked. Within the returned videos, a collection of keyframes can be selected from each of the videos. The keyframes now selected may be the same as the keyframes previously selected, or may be a more densely sampled collection. Detected faces can be clustered in the keyframe set from each video. The resulting face clusters can be compared (e.g., matched) with a selected query face image.

For a particular video, if there is at least one face cluster that matches the selected query face, the video can be identified as relevant that contains the target person. A ranking score can be computed for each video. The ranking score can be comprised of one or more of the following factors: (a) a relevant video in which the target person appears ranks higher than a non-relevant video; (b) the total time period in the video in which the target person appears; (c) the number of times that the video has been viewed. Other factors may be included in determining the ranking score. The videos can be arranged (e.g., listed) according to the new rank.

As described above, from text-based visual media search results, retrieving visual media according to the present disclosure involves two rounds of keyframe extraction and face clustering, in the first round, keyframes can be extracted from a number of top returned visual media, for example, and all keyframes from the different returned visual media can be utilized together as a collection to which face clustering can be applied. In the second round, a keyframe set can be extracted within each returned visual media, and face clustering can be applied on the keyframe set within each visual media.

Figure 2B:
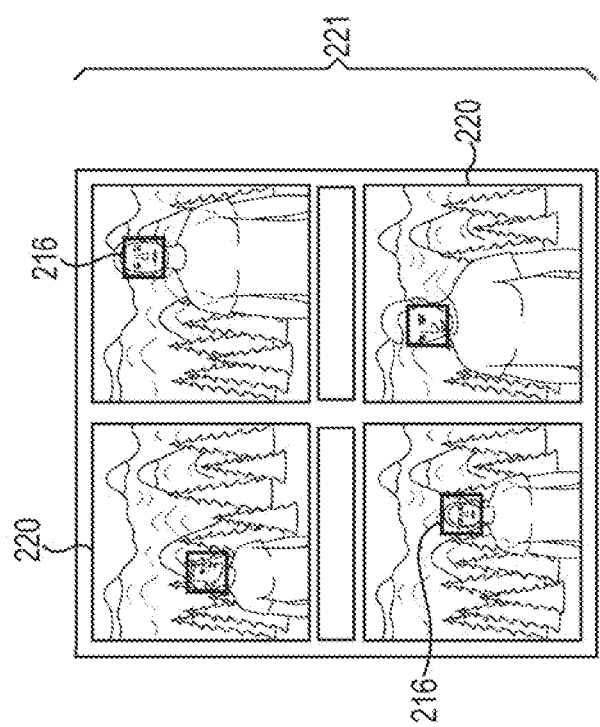
FIG. 2B illustrates a display of re-ranked visual media in accordance with one or more examples of the present disclosure.

FIG. 2B illustrates a display of re-ranked visual media 221 in accordance with one or more examples of the present disclosure. The re-ranked visual media 221 can include the top T videos 220, for example, as determined from the ranking score. The top T videos 220 can indicate the face images 216 associated with the cluster corresponding to the selected query image.

The results of a video search can be cached and updated. For quick response to user's query, videos can be processed offline (e.g., prior to a particular search) and the analysis results can be cached. For example with respect to an offline process, the visual media retrieval system can analyze tags and/or metadata of the most viewed videos to obtain the collection of most popular people (e.g., celebrities). With names of these people as text queries, the system can generate re-ranked results based on these queries. The video lists and locations of segments in which the target person(s) appear can be cached. The visual media retrieval system can constantly update the cached queries (e.g., list of people popular in viewed videos) with new input queries by users.

Also, the visual media retrieval system can regularly update the video search results with new videos uploaded to the dataset (e.g., Internet). The visual media retrieval system can be arranged such that video analysis may only need to be done on newly uploaded videos of a person in the existing list, or on videos of a query of people not previously in an existing list. While the visual media retrieval system can keep computing to provide better and better results, the storage required to store the cache can be minimized, for example, by only storing the pointers to the visual media and/or locations of related segments within particular visual media.

Once the most relevant visual media are identified and/or retrieved, the user may view the visual media, and/or directly jump to segments within the visual media in which a target person appears. The visual media may also be repurposed to compose customized visual media (e.g., video, photo) products. For example, the user may pick one or more segments of visual media that include the target person(s) from multiple visual media sources and make a new visual media containing selected appearances of the target person(s).

The visual media retrieval system can include visual media editing tools that may be applied to identified visual media. Keyframes of the target person(s) automatically identified or semi-automatically selected may also be displayed, which the user may edit. For example, a user may make a photobook of the target person(s).

Moreover, from face clusters within each relevant visual media, people who appear frequently with the target person may be discovered. Statistics can be obtained regarding who appears most often with the target person. Returned visual media can include, or a user may compose visual media that includes, the target person with other people who appear in the same scene.

Furthermore, the visual media retrieval system can be applied to reveal certain social relations relative to the targeted person(s), and related statistics. The user may further compose visual media products of multiple target people appearing together (e.g., such as a user appearing with a celebrity).

Figure 3:
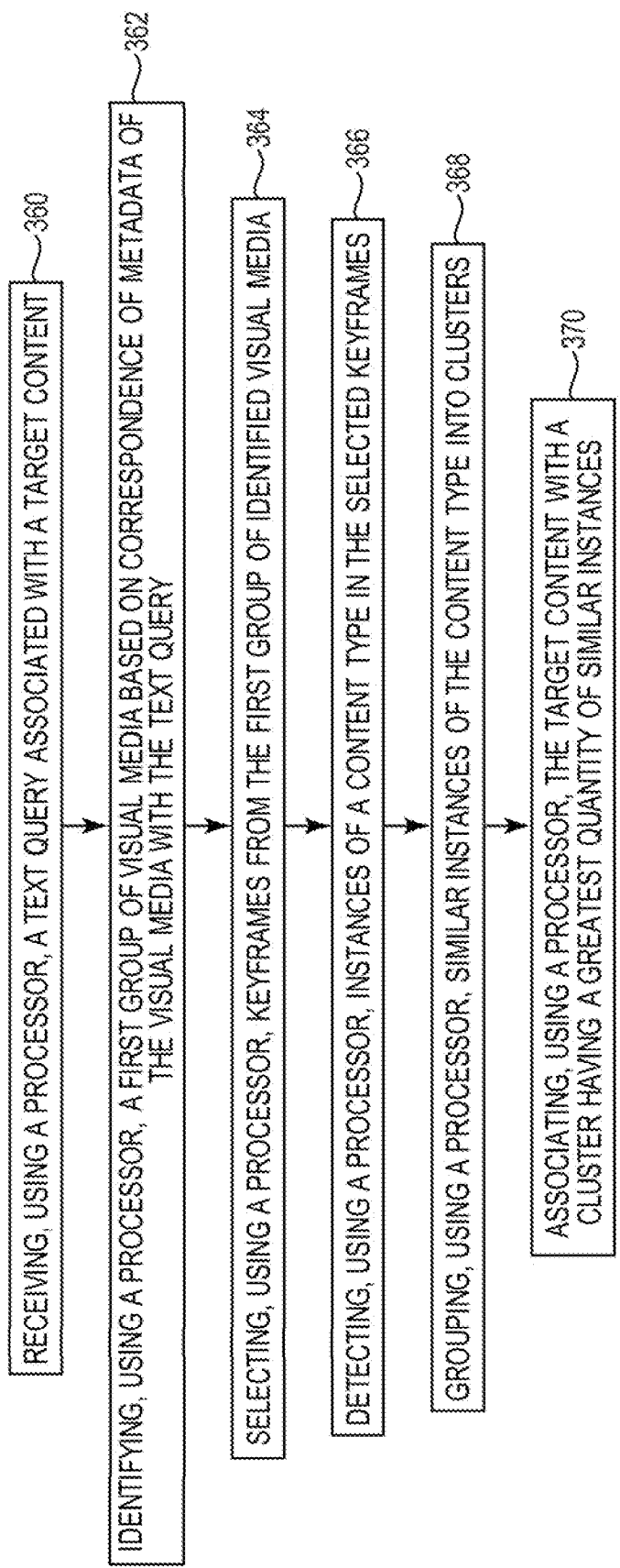
FIG. 3 illustrates a flow diagram of a method for retrieving visual media in accordance with one or more examples of the present disclosure.

FIG. 3 illustrates a flow diagram of a method for retrieving visual media in accordance with one or more examples of the present disclosure. One example method includes receiving a text query associated with a target content at 360. A first group of visual media can be identified based on correspondence of metadata of the visual media with the text query, as shown at 362. At 364, keyframes from the first group of identified visual media are selected. The method further includes detecting instances of a content type in the selected keyframes as indicated at 366, and grouping similar instances of the content type into clusters at 368. The target content can be associated with a cluster having a greatest quantity of similar instances, as indicated at 370.

Figure 4:
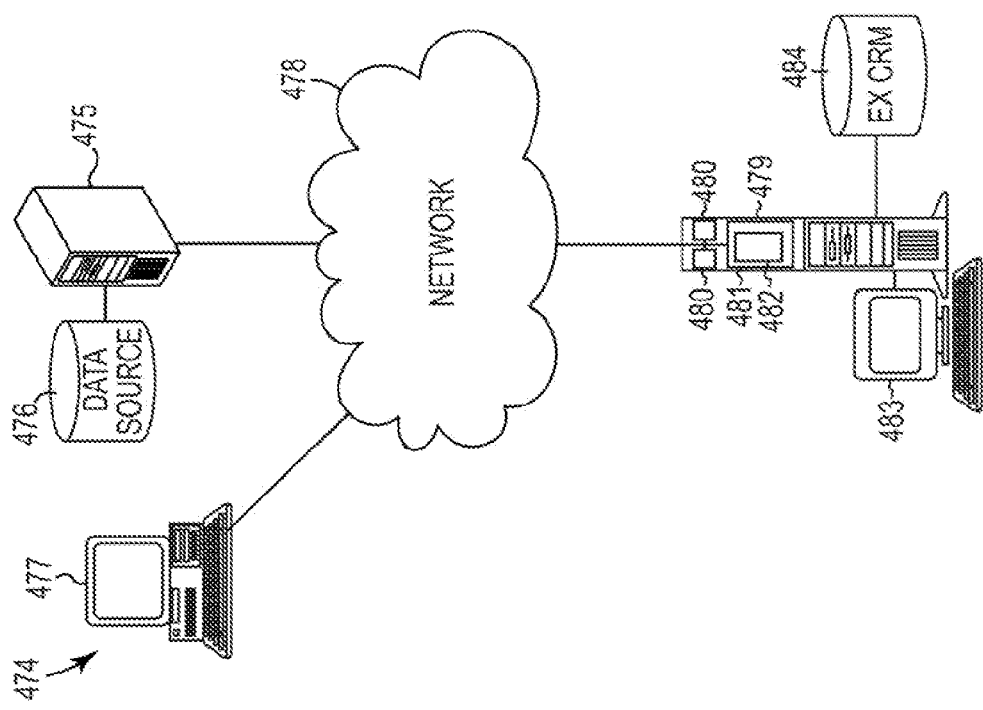
FIG. 4 illustrates a block diagram of an example computing system for retrieving visual media in accordance with one or more examples of the present disclosure.

FIG. 4 illustrates a block diagram of an example computing system used to implement visual media searching according to the present disclosure. The computing system 474 can be comprised of a number of computing resources communicatively coupled to the network 478. FIG. 4 shows a first computing device 475 that may also have an associated data source 476, and may have one, or more input/output devices (e.g., keyboard, electronic display). A second computing device 479 is also shown in FIG. 4 being communicatively coupled to the network 478, such that executable instructions may be communicated through the network between the first and second computing devices.

Second computing device 479 may include one or more processors 480 communicatively coupled to a non-transitory computer-readable medium 481. The non-transitory computer-readable medium 481 may be structured to store executable instructions 482 (e.g., one or more programs) that can be executed by the one or more processors 480 and/or data. The second computing device 479 may be further communicatively coupled to a production device 483 (e.g., electronic display, printer, etc.). Second computing device 479 can also be communicatively coupled to an external computer-readable memory 484.

The second computing device 479 can cause an output to the production device 483, for example, as a result of executing instructions of one or more programs stored on non-transitory computer-readable medium 481, by the at least one processor 480, to implement a system for retrieving visual media according to the present disclosure. Causing an output can include, but is not limited to, displaying text and images to an electronic display and/or printing text and images to a tangible medium (e.g., paper). Executable instructions to implement visual media retrieving may be executed by the first computing device 475 and/or second computing device 479, stored in a database such as may be maintained in external computer-readable memory 484, output to production device 463, and/or printed to a tangible medium.

One or more additional computers 477 may also be communicatively coupled to the network 478 via a communication link that includes a wired and/or wireless portion. The computing system can be comprised of additional multiple interconnected computing devices, such as server devices and/or clients. Each computing device can include control circuitry such as a processor, a state machine, application specific integrated circuit (ASIC), controller, and/or similar machine.

The control circuitry can have a structure that provides a given functionality, and/or execute computer-readable instructions that are stored on a non-transitory computer-readable medium (e.g., 476, 481, 484). The non-transitory computer-readable medium can be integral (e.g., 481), or communicatively coupled (e.g., 476, 484) to the respective computing device (e.g. 475, 479) in either a wired or wireless manner. For example, the non-transitory computer-readable medium can be an internal memory, a portable memory, a portable disk, or a memory located internal to another computing resource (e.g., enabling the computer-readable instructions to be downloaded over the Internet). The non-transitory computer-readable medium 330 can have computer-readable instructions stored thereon that are executed by the control circuitry (e.g., processor) to provide a particular functionality.

The non-transitory computer-readable medium, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), among others. The non-transitory computer-readable medium can include optical discs, digital video discs (DVD), Blu-ray discs, compact discs (CD), laser discs, and magnetic media such as tape drives, floppy discs, and hard drives, solid state media such as flash memory, EEPROM, phase change random access memory (PCRAM), as well as other types of machine-readable media.

Logic can be used to implement the method(s) of the present disclosure, in whole or part. Logic can be implemented using appropriately configured hardware and/or machine readable instructions (including software). The above-mentioned logic portions may be discretely implemented and/or implemented in a common arrangement.

Figure 5:
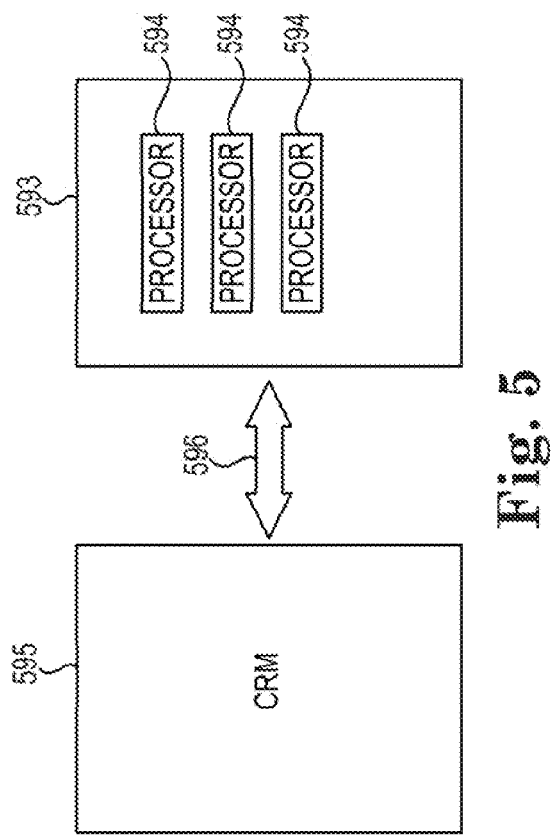
FIG. 5 illustrates a block diagram of an example computer readable medium (CRM) in communication with processing resources in accordance with one or more examples of the present disclosure.

FIG. 5 illustrates a block diagram of an example computer readable medium (CRM) 595 in communication, e.g., via a communication path 596, with processing resources 593 according to the present disclosure. As used herein, processor resources 593 can include one or a plurality of processors 594 such as in a parallel processing arrangement. A computing device having processor resources can be in communication with, and/or receive a tangible non-transitory computer readable medium (CRM) 595 storing a set of computer readable instructions (e.g., software) for capturing and/or replaying network traffic, as described herein.

The above specification, examples and data provide a description of the method and applications, and use of the system and method of the present disclosure. Since many examples can be made without departing from the spirit and scope of the system and method of the present disclosure, this specification merely sets forth some of the many possible example configurations, and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples provided herein. The above description has been made in an illustrative fashion, and not a restrictive one. Combination of the above examples, and other examples not specifically described herein will be apparent upon reviewing the above description. Therefore, the scope of one or more examples of the present disclosure should be determined based on the appended claims, along with the full range of equivalents that are entitled.

Throughout the specification and claims, the meanings identified below do not necessarily limit the terms, but merely provide illustrative examples for the terms. The meaning of "a," "an," and "the" includes plural reference, and the meaning of "in" includes "in" and "on." "Embodiment," as used herein, does not necessarily refer to the same embodiment, although it may.

In the foregoing discussion of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of this disclosure.

Some features are grouped together in a single embodiment for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed example. The following claims are hereby incorporated into the Detailed Description, with each claim standing on its own.

What is claimed:

1. A method for retrieving visual media, comprising:
receiving, using a processor, a text query associated with a target content;
identifying, using the processor, a first group of visual media based on correspondence of metadata of the visual media with the text query;
selecting, using the processor, keyframes from the first group of identified visual media;
detecting, using the processor, instances of a content type in the selected keyframes;
grouping, using the processor, similar instances of the content type into clusters;
associating, using the processor, the target content with a cluster having a greatest quantity of similar instances;
indexing, using the processor, locations within the visual media based on content type in the selected keyframes; and repurposing, using the processor, images directly from the indexed locations within the visual media into a new customized visual media product.

2. The method of claim 1, wherein:
receiving, using the processor, a text query associated with a target content includes receiving a name, the target content being one or more images of a person with the name; and
detecting, using the processor, instances of a content type in the selected keyframes includes detecting face images.

3. The method of claim 1, further comprising:
selecting, using the processor, instances of a content type from each cluster having a predetermined threshold quantity of similar instances; and
displaying, using the processor, the instances of a content type for each of the clusters having the threshold quantity of similar instances in an order corresponding to cluster size,
wherein cluster size corresponds to quantity of similar instances of the content type in the cluster.

4. The method of claim 3, wherein selecting and displaying the instances of a content type for each of the clusters includes respectively selecting and displaying images of faces appearing in one or more video clips.

5. The method of claim 4, wherein displaying images of faces appearing in one or more video clips includes displaying a largest face image and displaying a face image most different from a selected face image.

6. The method of claim 3, further comprising:
receiving, using the processor, a user selection of at least one of the displayed instances;
identifying, using the processor, a second group of visual media based on correspondence of metadata of the visual media with the text query and the selected instances of a content type;
selecting, using the processor, second keyframes from the second group of identified visual media;
detecting, using the processor, second instances of a content type in the selected second keyframes;
grouping, using the processor, similar second instances of the content type into clusters; and
determining, using the processor, matches between the second instances of the content type and the selected instances of a content type.

7. The method of claim 6, further comprising:
determining, using the processor, a ranking score for visual media having at least one determined match based on cumulative time during which the selected instances of a content type appear; and
displaying, using the processor, a listing of the visual media based on ranking score.

8. The method of claim 7, further comprising creating, using the processor, an index of the visual media based on ranking score and a quantity of occurrences that the visual media is viewed, the index including a location of the visual media and one or more locations within the visual media at which a particular instance of a content type appears.

9. The method of claim 7, further comprising:
analyzing, using the processor, metadata of most-viewed visual media and a name associated with each respective most-viewed visual media prior to receiving the text query;
generating, using the processor, a re-ranked result corresponding to the name;
caching, using the processor, the re-ranked result; and
updating, using the processor, the cached re-ranked result responsive to new text queries.

10. A non-transitory computer-readable medium having computer-executable instructions stored thereon, the computer-executable instructions comprising instructions that, if executed by one or more processors, cause the one or more processors to:
retrieve a group of visual media based on correspondence of metadata of the visual media with a text query;
select keyframes from the group of retrieved visual media;
apply face clustering to the keyframes from the group of retrieved visual media;
generate query face images based on the face clusters;
re-rank the group of retrieved visual media on a display based on a received input corresponding to a particular one of the query face images;
index locations within the group of visual media based on the face clusters; and
repurpose images directly from the indexed locations within the group of visual media into a new customized visual media product.

11. The non-transitory computer-readable medium of claim 10, further comprising instructions that, if executed by one or more processors, cause the one or more processors to indicate portions of a selected one of the group of retrieved visual media corresponding to a selected query face image.

12. A computing system, comprising:
a display;
a non-transitory computer-readable medium having computer-executable instructions stored thereon; and
a processor coupled to the display and the non-transitory computer-readable medium, wherein the processor executes the instructions to:
retrieve a group of visual media based on correspondence of metadata of the visual media with a text query;
select keyframes from the group of retrieved visual media;
apply face clustering to the keyframes from the group of retrieved visual media;
generate query face images based on face clusters;
re-rank the group of retrieved visual media on the display based on a received input corresponding to a particular one of the query face images;
index locations within the group of visual media based on the face clustering; and
repurpose images directly from the indexed locations within the group of visual media into a new customized visual media product.

13. The computing system of claim 12, wherein the processor executes the instructions to display portions of a particular retrieved visual media based on a received input corresponding to a particular one of the query face images.

* * * * *